(12) United States Patent
Lakshmanan et al.

(10) Patent No.: US 10,021,133 B1
(45) Date of Patent: Jul. 10, 2018

(54) SYSTEM AND METHOD FOR ANTI-PHISHING SYSTEM

(71) Applicant: CIPHERCLOUD, INC., San Jose, CA (US)

(72) Inventors: Meenakshi Sundaram Lakshmanan, San Jose, CA (US); Ram Goda, Milpitas, CA (US); Shailesh Patel, San Jose, CA (US)

(73) Assignee: CIPHERCLOUD, INC., San Jose, CA (US)

( * ) Notice: Subject to any disclaimer, the term of this patent is extended or adjusted under 35 U.S.C. 154(b) by 66 days.

(21) Appl. No.: 14/942,983

(22) Filed: Nov. 16, 2015

Related U.S. Application Data

(60) Provisional application No. 62/079,994, filed on Nov. 14, 2014.

(51) Int. Cl.
*H04L 29/06* (2006.01)
(52) U.S. Cl.
CPC ................ *H04L 63/1483* (2013.01)
(58) Field of Classification Search
CPC .. H04L 63/14; H04L 63/1441; H04L 63/1483
See application file for complete search history.

(56) References Cited

U.S. PATENT DOCUMENTS

| 8,495,735 | B1* | 7/2013 | Warner | H04L 51/12 705/50 |
| 9,141,797 | B1* | 9/2015 | Chang | G06F 21/56 |
| 2011/0167474 | A1* | 7/2011 | Sinha | G06F 21/56 726/1 |
| 2011/0191849 | A1* | 8/2011 | Jayaraman | H04L 63/1416 726/23 |
| 2012/0023566 | A1* | 1/2012 | Waterson | G06F 21/56 726/9 |
| 2015/0381654 | A1* | 12/2015 | Wang | H04L 63/101 726/23 |

FOREIGN PATENT DOCUMENTS

WO    WO 2015/000422    * 1/2015

* cited by examiner

*Primary Examiner* — Khang Do
(74) *Attorney, Agent, or Firm* — Minisandram Law Firm; Raghunath S. Minisandram

(57) ABSTRACT

A system and method for detecting a phishing site is disclosed. A message from a client to the site is intercepted by a security gateway. The security gateway determines if the site is a known-site or an unknown-site. If it is a known site, a reputation of the site is checked. If the site is a known-site with a bad reputation, connection between the client and the site is reset. If the site is a known-site with a good reputation, known-site testing is performed for possible phishing attack. If the site is an unknown-site, unknown-site testing for possible phishing attack is performed.

8 Claims, 7 Drawing Sheets

SYSTEM AND METHOD FOR ANTI-PHISHING SYSTEM

CROSS-REFERENCE TO RELATED APPLICATIONS

This application claims priority to U.S. provisional patent application No. 62/079,994 filed on Nov. 14, 2014, entitled "Anti-phishing system", which is incorporated herein by reference, in its entirety.

TECHNICAL FIELD

The embodiments herein relate to security systems and, more particularly, to anti-phishing security systems.

DESCRIPTION OF RELATED ART

Phishing is the act of fraudulently attempting to acquire sensitive information such as user name, passwords, credit card information, and social security number from users by posing as a legitimate and trustworthy entity. The process of phishing is usually carried out via electronic communication messages (like email and instant messages) directing users to enter sensitive information on a counterfeit web page (phishing web page), which typically resembles the web page of another well known and trustworthy website (for example, website of a well known bank). The phishing activity may result in users entering sensitive information on the phishing web page, and/or downloading and executing an unknown binary or executable file.

Further, phishing activities are becoming more targeted. Some phishing websites identify and target specific users that have a tendency to visit a particular site, and present them with fraudulent messages containing links to phishing websites that look like the site user is accustomed to visiting. Such phishing attacks are known as spear phishing attacks.

Phishing results in losses in billions of dollars to users and organizations around the world every year. One of the main challenges of identifying and preventing phishing attacks is that the phishing web pages are very short lived, meaning the phishing websites are hosted only for a few hours to avoid any detection. Therefore, before a web page or website is identified as a phishing website, the website may not exist anymore. The problem is further compounded by spear phishing attacks where, due to the targeted approach by the attacks, it takes more time to collect information and identify that the messages are related to a phishing attack.

Various solutions are deployed in corporate networks to ensure that users within the network do not access phishing web pages by mistake. Most networks deploying anti-phishing solutions use published signatures (like a fingerprint of a website) of counterfeit websites to identify a phishing attack. To address the sophistication of phishing attacks, companies like GOOGLE started offering API (Application Programming Interface) services to access a live blacklist API. The blacklist services offered by companies like GOOGLE are developed using a combination of manual and automated processes, some services using more automated techniques than others.

Still, response to phishing attacks are static and very limited in nature, and rely for most part on published signatures and blacklists. When a company network faces a new phishing attack which is not captured by any of the signature publication services and blacklisting services, the company has no recourse.

SUMMARY OF THE INVENTION

In one embodiment, a method for detecting a phishing site is disclosed. A message from a client to the site is intercepted by a security gateway. The security gateway determines if the site is a known-site or an unknown-site. If it is a known site, a reputation of the site is checked. If the site is a known-site with a bad reputation, connection between the client and the site is reset. If the site is a known-site with a good reputation, known-site testing is performed for possible phishing attack. If the site is an unknown-site, unknown-site testing for possible phishing attack is performed.

In yet another embodiment, a system to detect a phishing site is disclosed. A message from a client to the site is intercepted by a security gateway. The security gateway determines if the site is a known-site or an unknown-site. If it is a known site, a reputation of the site is checked. If the site is a known-site with a bad reputation, connection between the client and the site is reset. If the site is a known-site with a good reputation, known-site testing is performed for possible phishing attack. If the site is an unknown-site, unknown-site testing for possible phishing attack is performed.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

Figure 1:
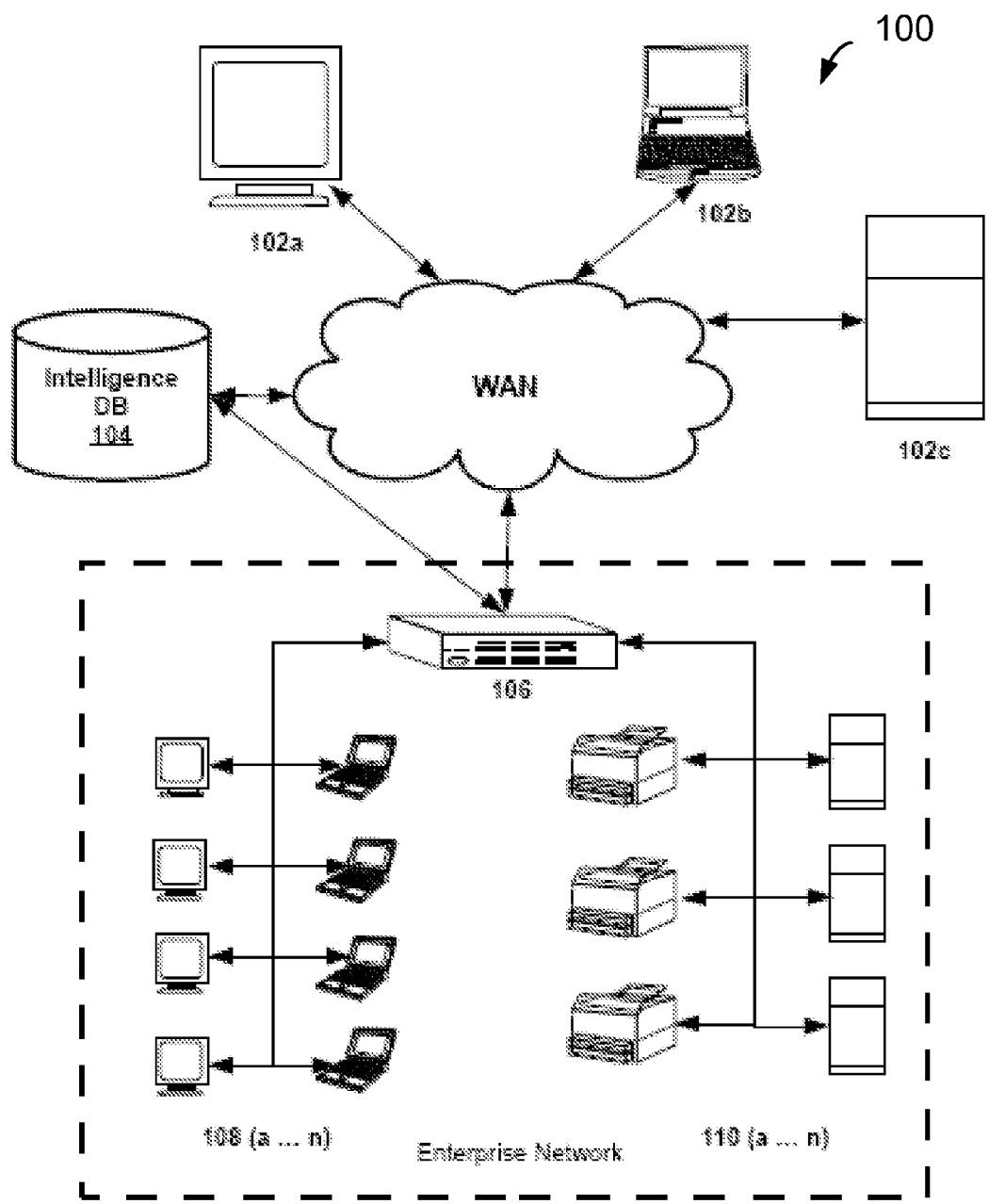
FIG. 1 depicts an example system in an enterprise network implementing the methods for real-time verification of phishing activities on a remote host, according to embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for detection and negation of phishing attempts. Referring now to the drawings, and more particularly to FIGS. 1 through 4B, where similar reference characters denote corresponding features consistently throughout the figures, there are shown embodiments.

FIG. 1 depicts an example system 100 in an enterprise network implementing the methods for real-time verification of phishing activities on a remote host, according to embodiments herein. A plurality of remote hosts 102 may access the enterprise network typically through a Wide Area Network (WAN) like the Internet or telecommunication networks. For the sake of simplicity, we will continue to refer to the Internet as the WAN being used. All inbound and outbound traffic concerning the enterprise network flows through the security gateway 106. The security gateway may further interact with an intelligence database 104 that may contain and/or provide information about potential phishing sites and web pages.

In a preferred embodiment the intelligence database 104 is a hosted service that may be accessed by a plurality of security gateways within a single enterprise or multiple enterprises. In such instances, the security gateway may access the intelligence database 104 via the WAN. In other embodiments, the intelligence database 104 may be a dedicated instance that is hosted specifically for the enterprise network and, therefore, may be hosted within the network or embedded as part of the security gateway 106.

The traffic passing through the security gateway is a result of various interactions between the computing devices 108, 110 within the network, and the hosts and computing devices 102 outside the network. One or more of the hosting devices 102 outside the network could potentially be hosting phishing sites or induce otherwise legitimate websites to host one or more phishing web pages to obtain sensitive information from user by, for example, inducing users to enter such sensitive information.

The suspicion on the host that triggers the real-time verification of a host may be raised either due to information obtained from the intelligence database 104, or through real-time analysis of the source of the traffic or the traffic itself, or a combination thereof. For example, an email that induces a user to click a particular Unified Resource Locator (URL) embedded in the email may raise suspicion to trigger the real-time analysis of the site/page. In other embodiments, it is possible that the security gateway 106 gets suspicious of a URL owing to the similarity of the components of the URL with another URL of a well-known and respected site.

The intelligence database 104 may obtain information regarding phishing sites from publicly available sources including but not limited to published signatures of phishing sites/pages, and the publicly available blacklisting APIs and services. The security gateway 106 can push information regarding phishing sites/pages based on real-time analysis of sites.

Access to the enterprise network may also be enabled through other network mechanisms including but not limited to Personal Area Networks (PANs), Local Area Networks (LANs), Campus Area Networks (CANs), or Metropolitan Area Networks (MANs). The type of network employed within the enterprise and the reach provided to outside depend on the type of the enterprise, the needs of the enterprise, the distributed nature of the enterprise among other parameters.

Figure 2:
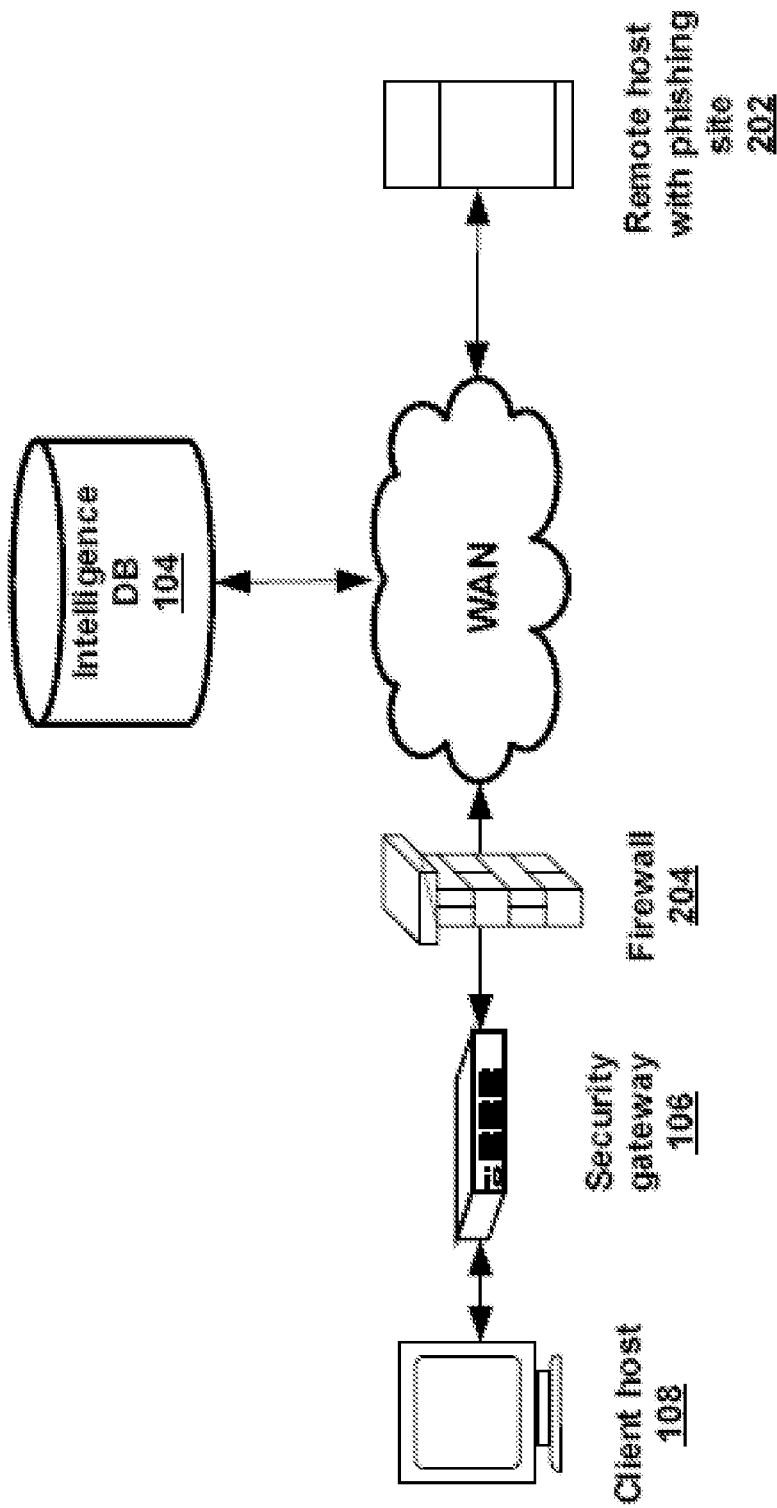
FIG. 2 depicts a simpler view of the interactions between the security gateway and a remote host potentially hosting a phishing site, according to embodiments herein.

FIG. 2 depicts a simpler view of the interactions between the security gateway 106 and a remote host 202 potentially hosting a phishing site, according to embodiments herein. The simpler system depicted in FIG. 2 will be used to illustrate the methods described herein. However, the example system in FIG. 2 must not be construed to be limiting the nature or application of the methods described herein.

In a preferred embodiment, the security gateway is hosted inside the enterprise network behind a firewall 204. In some embodiments, the gateway 106 may be deployed outside the network as a cloud service, where all Internet traffic is routed through the cloud service. In other embodiments, the security gateway 106 itself may be part of a firewall or may host firewall capabilities in addition to the security capabilities described herein. In some other embodiments, the security gateway 106 may also be outside of the enterprise network and therefore outside of the purview of the firewall 204, and may be the first entity to interact with all incoming traffic and the last entity to interact with outgoing traffic.

Figure 3:
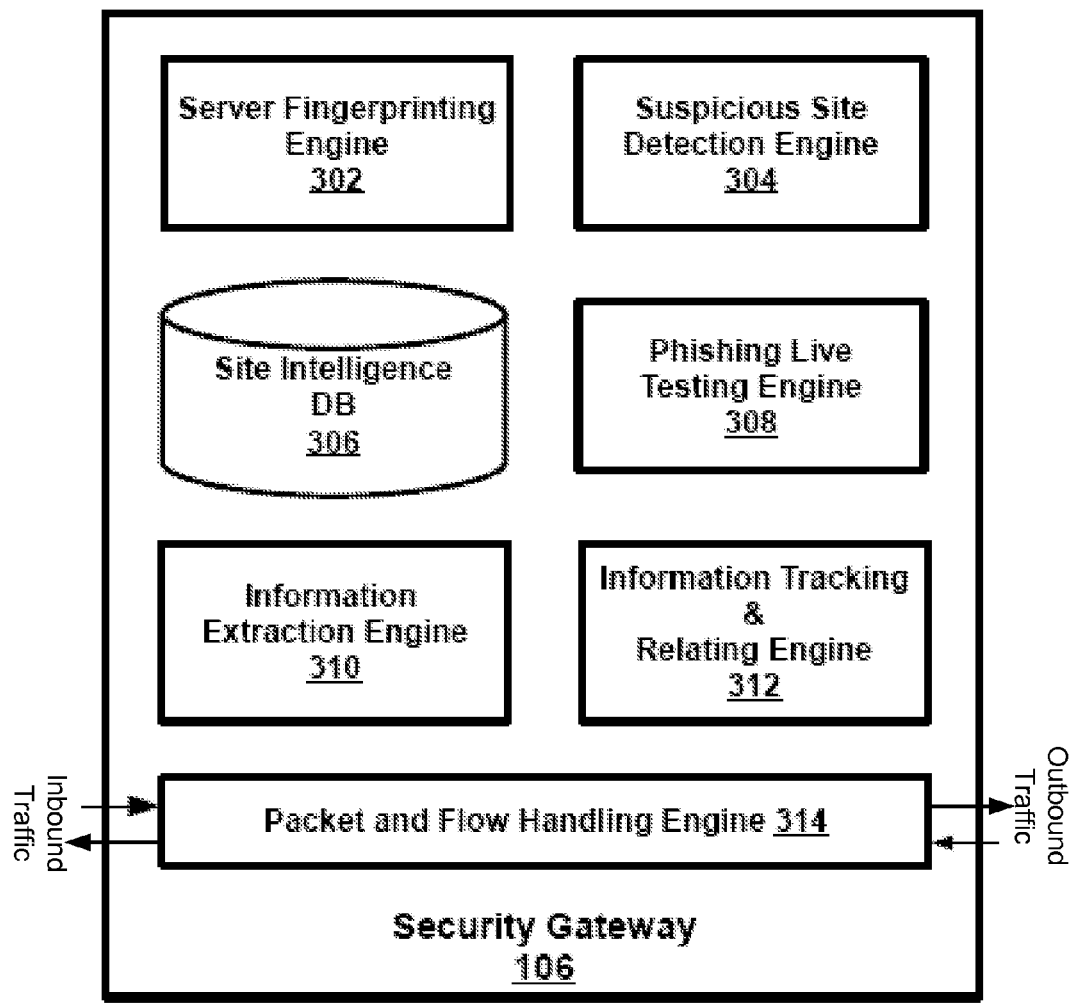
FIG. 3 is a block diagram depicting a security gateway according to embodiments herein.

FIG. 3 is a block diagram depicting a security gateway 106 according to embodiments herein. The security gateway 106 includes Server Fingerprinting Engine 302, a Suspicious Site Detection Engine 304, a Site Intelligence DB 306, a phishing live testing engine (PLTE) 308, an information extraction engine 310, an information tracking and relating engine 312, and a packet and flow handling engine 314.

In a preferred embodiment, all traffic that is bound inward to and outward from the enterprise network flows through the security gateway 106. The Packet and Flow Handling Engine 314 of the security gateway 106 intercepts all communication between client 108 and remote hosts 202 (typically, servers like web servers serving information based on requests). The engine 314 intercepts all traffic in a stateful manner and tracks all packets, and thereby keeping track of state of network connections (TCP streams, UDP communications, etc). Such state information is maintained in the Site Intelligence DB 306.

The Site Intelligence DB 306 hosts intelligence data on sites, data relating to packet and flow handling, associated state information among others. Considering a well-known and popular site like www.salesforce.com as an example, the Site Intelligence DB 306 may host the IP addresses it uses, certificates it presents, the kind of authentication it does, the key images/links it has, the domain or domains it cross connects and loads among others. When the Site Intelligence DB 306 comes across an unknown site, it may pull intelligence about the unknown site, or collect it, or update the master intelligence DB 104 outside the network.

Apart from the state information, the database also synchronizes itself on a periodic basis with the intelligence database 104 outside the network by pulling data to host the latest information on known phishing and blacklisted sites as obtained by the intelligence database through other sources. The Site Intelligence DB 306 also pushes information on new sites identified as phishing sites or otherwise, to the intelligence database 104. Various mechanisms may be used to synchronize data between the Site Intelligence DB 306 and the intelligence database 104 including but not limited to push or pull or other known mechanisms.

The information extraction engine 310 gathers information regarding traffic from the packet and flow handling engine. The information gathered by the information extraction engine 310 includes but is not limited to IP address of the remote host, domain name of the remote host, Requested URL by a client, response page from the remote host (example, HTML, JavaScript and so on), and other content exchanged between a client and the remote host (such as images, documents, and so on). The information extraction engine 310 may store some or all of the information gathered for further inspection and analysis in the Site Intelligence DB 306.

The information tracking and relating engine 312 establishes relationships between different communication flows such as the DNS request and response, request and response, server redirects and referrals etc. in the exchanges between the client 108 and the remote host 202. Such relationships may be stored in the Site Intelligence DB 306 for future use. Among other things, the relationships may be useful to understand the pattern of behavior exhibited by a remote host and the kind of behavior induced by the remote host on the client.

The Server Fingerprinting Engine 302 scans remote hosts to generate fingerprint of a site or a page of interest. A fingerprint for a site is generated using information collected by the Server Fingerprinting Engine 302. The fingerprint generated may be based on but not limited to other sites connected to or referred to by the site, type of content served by the site, IP addresses used by the site, certificates used by the site, etc. The Server Fingerprinting Engine 302 uses the Site Intelligence DB 306 to keep state information of a site or page, including the fingerprint information.

The Suspicious Site Detection Engine 304 categorizes sites as either suspicious or not. The Suspicious Site Detection Engine 304 uses prior known information, and information gathered from traffic passing through the Security gateway 106 to assess phishing attack risk from a site before categorizing a site as being suspicious. The Suspicious Site Detection Engine 304 also uses the Site Intelligence DB 306 to store suspicion state and other association information relating to the site.

The Security Gateway attempts to categorize every site having interactions with at least one client inside the network. A site may be a known site with no known phishing activity, or a known site with occasional phishing activity observed on certain pages of the site, or a known site that is marked a site engaging in phishing activity, or an unknown site. The Security Gateway may follow different approaches for different sites to ensure security of the network. In a preferred embodiment, the Security Gateway reduces risk of phishing by blocking interactions with known sites that are known to engage in phishing activities, always checking for phishing activity on unknown sites and unknown pages of known sites, and checking for known pages of known sites with good reputation at least on a random basis and/or based on input from other sources.

When the Security Gateway detects a client's attempt to interact with a site (example, by way of trying to access a site or send a message to access the site), the Security Gateway checks for the status of the site with the Site Intelligence DB. The Site Intelligence DB may in turn check with the Intelligence DB outside the network for any update on the site status, before providing the status information. Further, the PLTE module may perform a live test on a site to verify if the site is engaging in phishing activity.

The PLTE 308 is the engine that actually preforms the live test on a site or a page hosted on the remote host to analyze and verify if the site or page is involving in phishing activity. The Suspicious Site Detection Engine 304, based on information from the Server Fingerprinting Engine 302, triggers the phishing live testing through PLTE 308 module.

Figure 4:
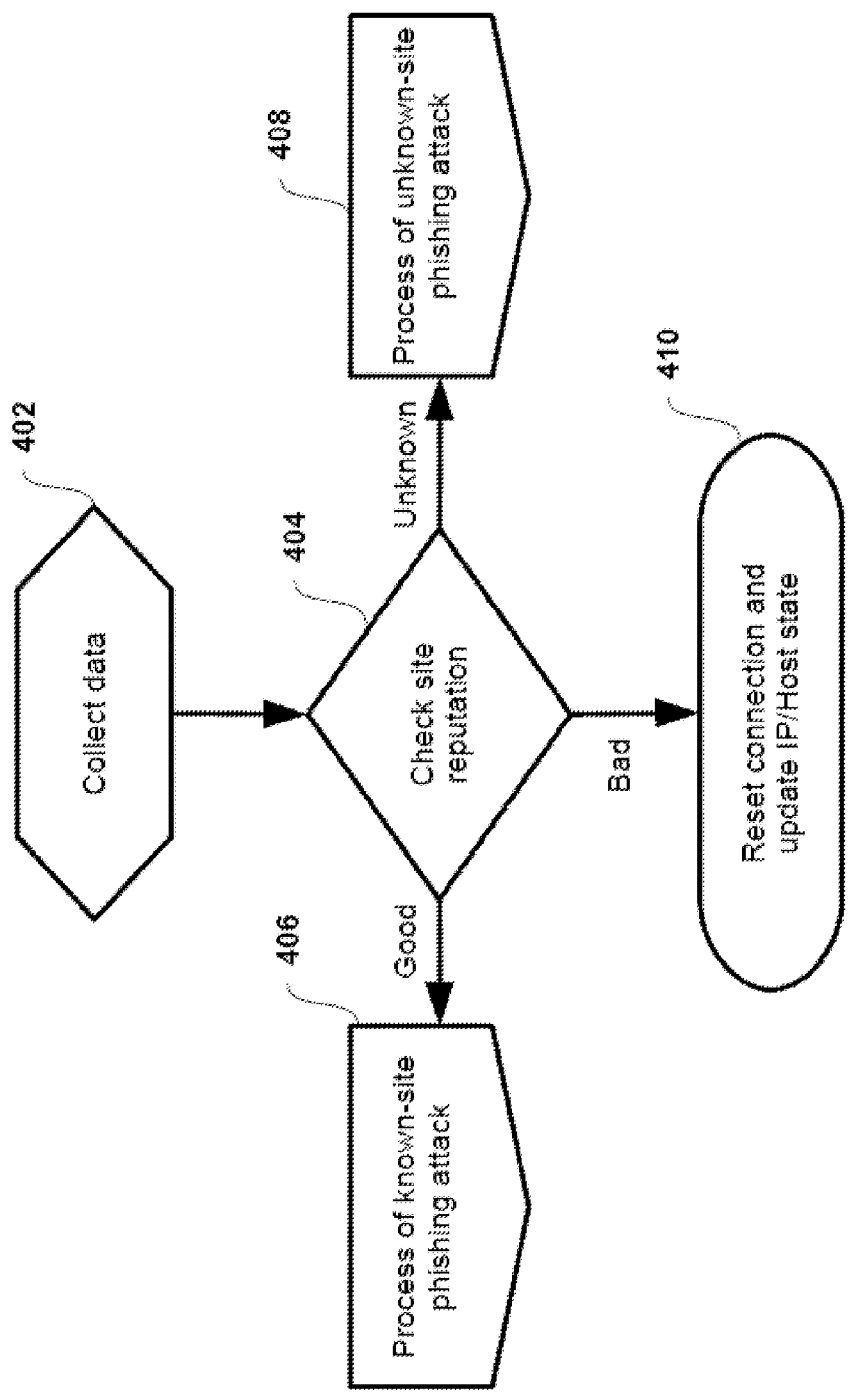
FIG. 4 depicts the broad level process adopted by the Security Gateway in implementing the real-time anti-phishing system, according to embodiments herein.

FIG. 4 depicts the broad level process adopted by the Security Gateway in implementing the real-time anti-phishing system, according to embodiments herein. At a broad level, the Security Gateway collects (402) data in real-time by intercepting traffic between one or more clients from within the enterprise network and a site on a remote host. Further, the Security Gateway checks (404) for reputation of the site. If the site is a known site of good reputation, then the Security Gateway proceeds to check for phishing attacks from the "known" site (406). If the site is unknown, then the Security Gateway proceeds to check for phishing attacks from the "unknown" site (408). And, if the site has a bad reputation, meaning the site is known to engage in phishing activity, then the Security Gateway may reset the connection (410) for the corresponding IP and/or Host, and may update the status of the IP and/or Host in the Site Intelligence DB. The Site Intelligence DB 306 may further push such information to the Intelligence DB 104 outside the network.

Figure 5:
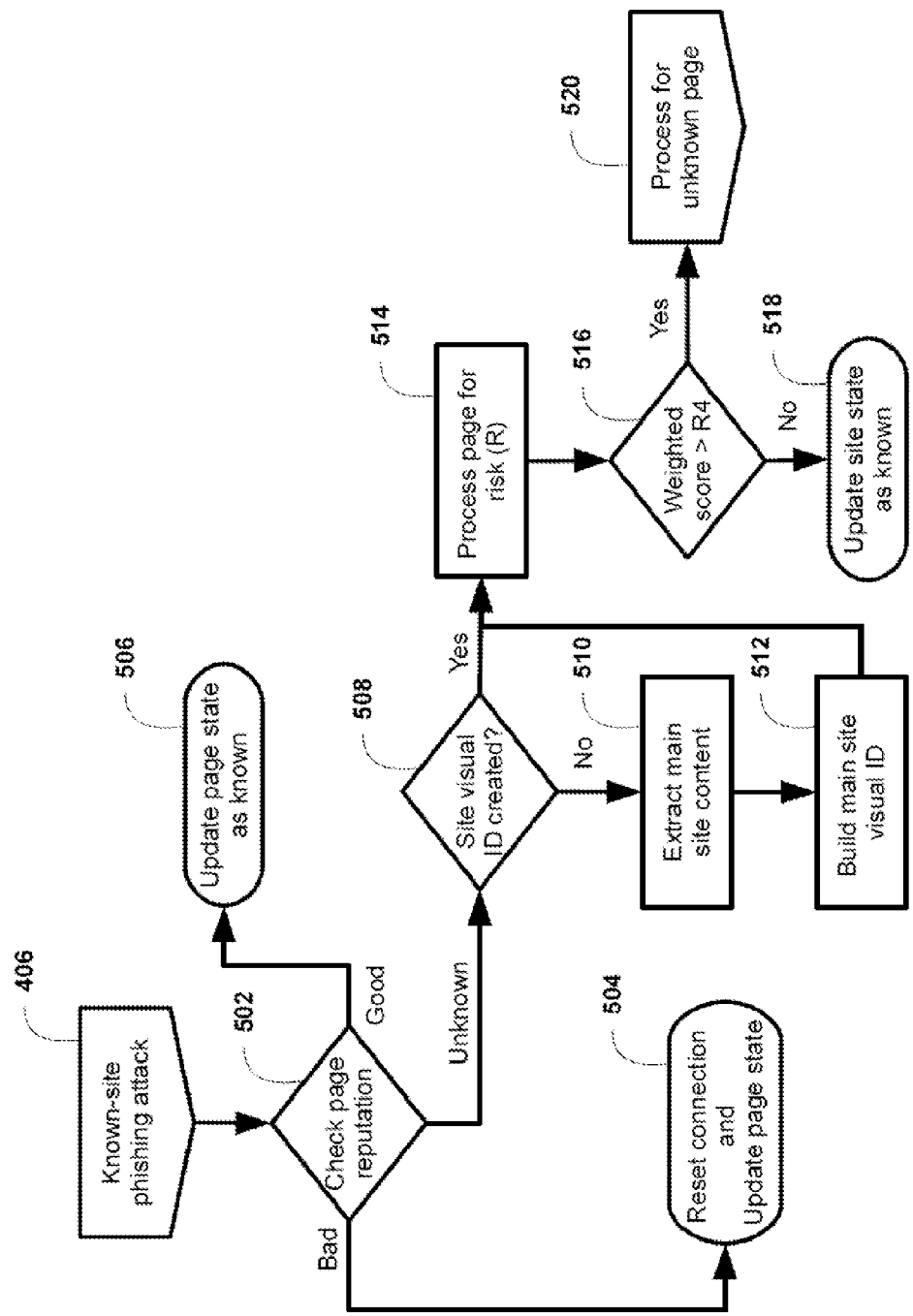
FIG. 5 depicts the flow chart representing process adopted by the Security Gateway to check for phishing activity on an known site, according to embodiments herein.

FIG. 5 depicts the flow chart representing process adopted by the Security Gateway to check for phishing activity on a known site (406), according to embodiments herein. The SSDE checks (502) for reputation of the known site that is interacting with one or more clients within the network. The Site Intelligence DB 306 provides the reputation information. If the Site Intelligence DB 306 does not possess the reputation information of the known site, the Site Intelligence DB 306 may find and obtain the information from the Intelligence DB 104 outside the network. SSDE 304 then checks for prior history on the folder/page from the URL. If the folder or page is known to be good, SSDE 304 retains/updates (506) the state of site as known. If the page is known to be bad the connection is disconnected, client is warned and Site Intelligence DB is updated (504). If folder or page is new or unknown then SSDE 304 proceeds to process the page/site further to assess phishing risk.

SSDE checks (508) if the Security Gateway has visual ID of the main site. If the visual ID main site is not available, SSDE 304 requests the Server Fingerprinting Engine (SFE) (302) to generate visual ID of the main site corresponding to known site. SFE extracts (510) the content from the main site, and builds the visual ID (512) of the main site. Once the visual ID is available, SSDE 304 proceeds to process (514) the page of the known site being interacted to assess phishing risk associated with the page. SSDE 304 generates a fourth weighted score for assessing the risk. If the weighted score crosses (516) a threshold value (say, R4), then SSDE 304 identifies and updates the status of the page as an unknown page of a known site, and proceeds to process (520) the unknown page. If the weighted risk score does not cross the threshold value of R4, then the site status may be retained or updated (518) as known.

Figure 6:
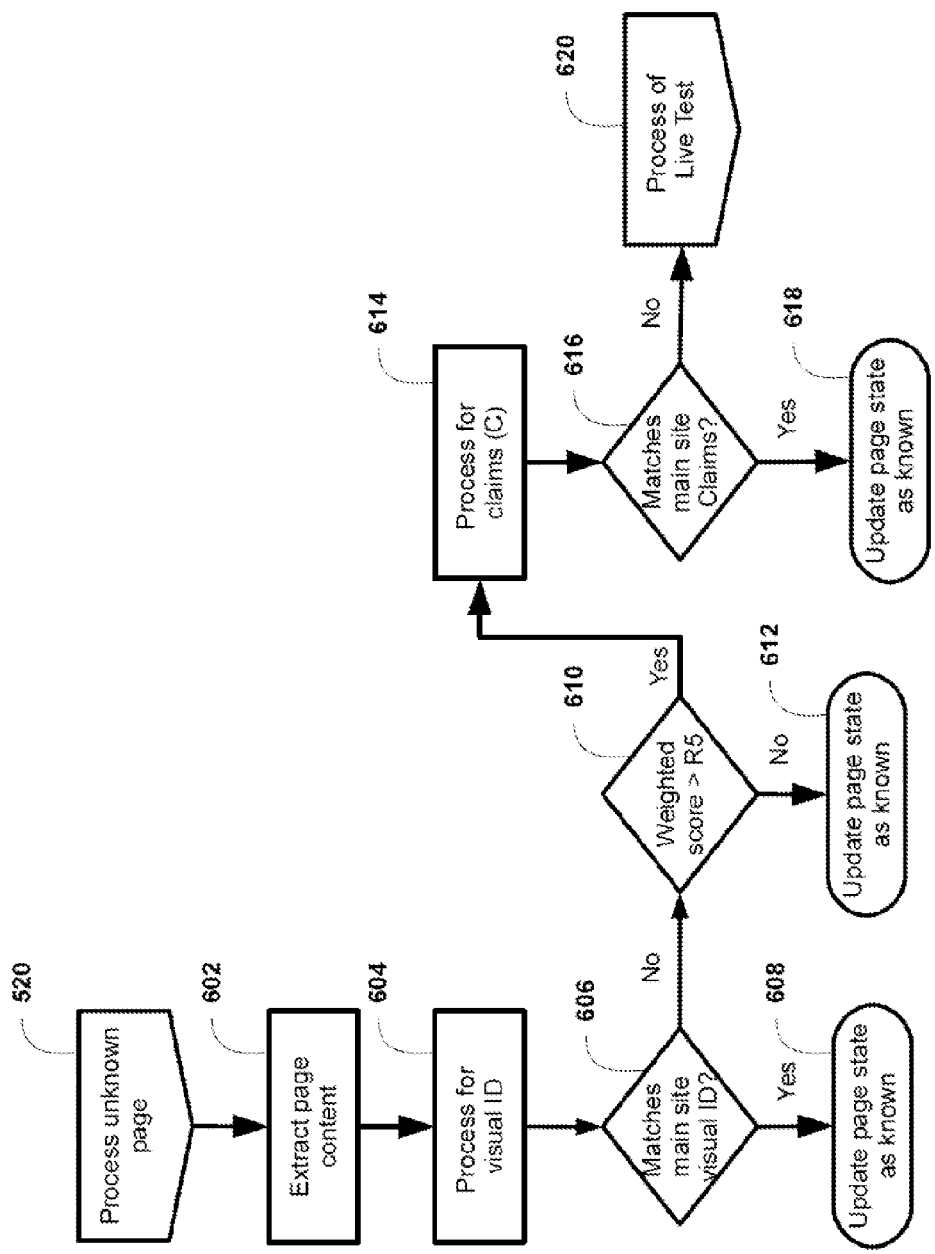
FIG. 6 depicts the flow chart representing process adopted by the Security Gateway to check for phishing activity on an unknown page of a known site as determined through process illustrated in FIG. 5, according to embodiments herein.

In various embodiments, a visual ID score to assess visual closeness of unknown site to a well known site using attributes including but not limited to one or more of the following attributes:

Visual ID Score—Attributes used to identifying the visual closeness of unknown site to a well known site Icons referred in HTML <head> carry more weight
  MD5 of 'favicon' found at root
  MD5 of 'favicon', 'apple-touch-icon' linked in head
  MD5 of primary logo/image Page Title—Keyword
MD5 of images downloaded—through HTML <img> tag
% of links cross connecting to other domains—weightage is more if they point to one particular domain FIG. 6 depicts the flow chart representing process (520) adopted by the Security Gateway to check for phishing activity on an unknown page of a known site as determined through process illustrated in FIG. 5, according to embodiments herein. The SSDE 304 extracts (602) the content of the unknown page of the known site, and processes (604) the page for generating visual ID. The visual ID may be generating by the SFE. The SSDE 304 further checks (606) if the visual ID of the unknown page matches with the visual ID of the corresponding main site (or, in this case, the known site). If SSDE 304 finds a match of the visual IDs, the SSDE 304 sets (608) the status of the page as known. If SSDE 304 does not find a match, SSDE 304 proceeds to process the page for further risk assessment. The SSDE 304 generates a fifth weighted risk score (sometimes referred to as a page risk score) based on relevant attributes. If the fifth weighted risk score crosses (610) a threshold value (say, R5), SSDE proceeds for further risk assessment. If the fifth weighted risk score does not cross (610) a threshold value of R5, then SSDE 304 updates (612) the status of the page as known. The message from the client is forwarded to the site.

In various embodiments, a page risk score may be arrived using URL and HTML, using attributes including but not limited to one or more of the following attributes:
Has IP address for host?
URL Keywords like (login, sign in etc.)
Folder/API new-ness(based on server change entropy)
Number of Sub folders
Page Content
  Obfuscated Java Scripts
  Hidden iFrames
Requires Input (using HTML Forms and Inputs)
  Requires Private Information (e.g. Password, email etc.)
  Collects lots of hidden information
Content Downloads
  Automatic vs Requested Download
  Triggers Automatic Downloads of Vulnerable content (e.g PDF)
  Plugins and Contents for Plugins (ActiveX, Java applet etc.)

If the weighted risk score crosses (610) the threshold value of R5, the SSDE 304 may further analyze the page for claims made on the page. Claims include but are not limited to copyright notices, references to any patents owned, brand names, symbols referring to registered marks or words, purported registered company names, and so on. The Information Extraction Engine 310 may obtain such information from one or more pages of the site by crawling the various links of the site. For example, once extracted, if links like "about us" and "contact us" are observed, then the SSDE 304 may check the links to see if they cross connect to a different domain. If they connect to same domain, then SSDE 304 may check if the page is a copy of well known site using signature items on the page (for example, address on a "contact us" page).

SSDE 304 extracts claim information of the page and compares (616) it with corresponding information from the main site (or, in this case, the known site). If the claims information on the page does not match with the claims information of the main site of the page, SSDE 304 induces a live testing process (620) on the unknown page of the known site through the PLTE 308. If the claims of the page match with the claims of the main site, then SSDE 304 sets (618) the status of the page of the known site as known. The message from the client is forwarded to the site.

Figure 7:
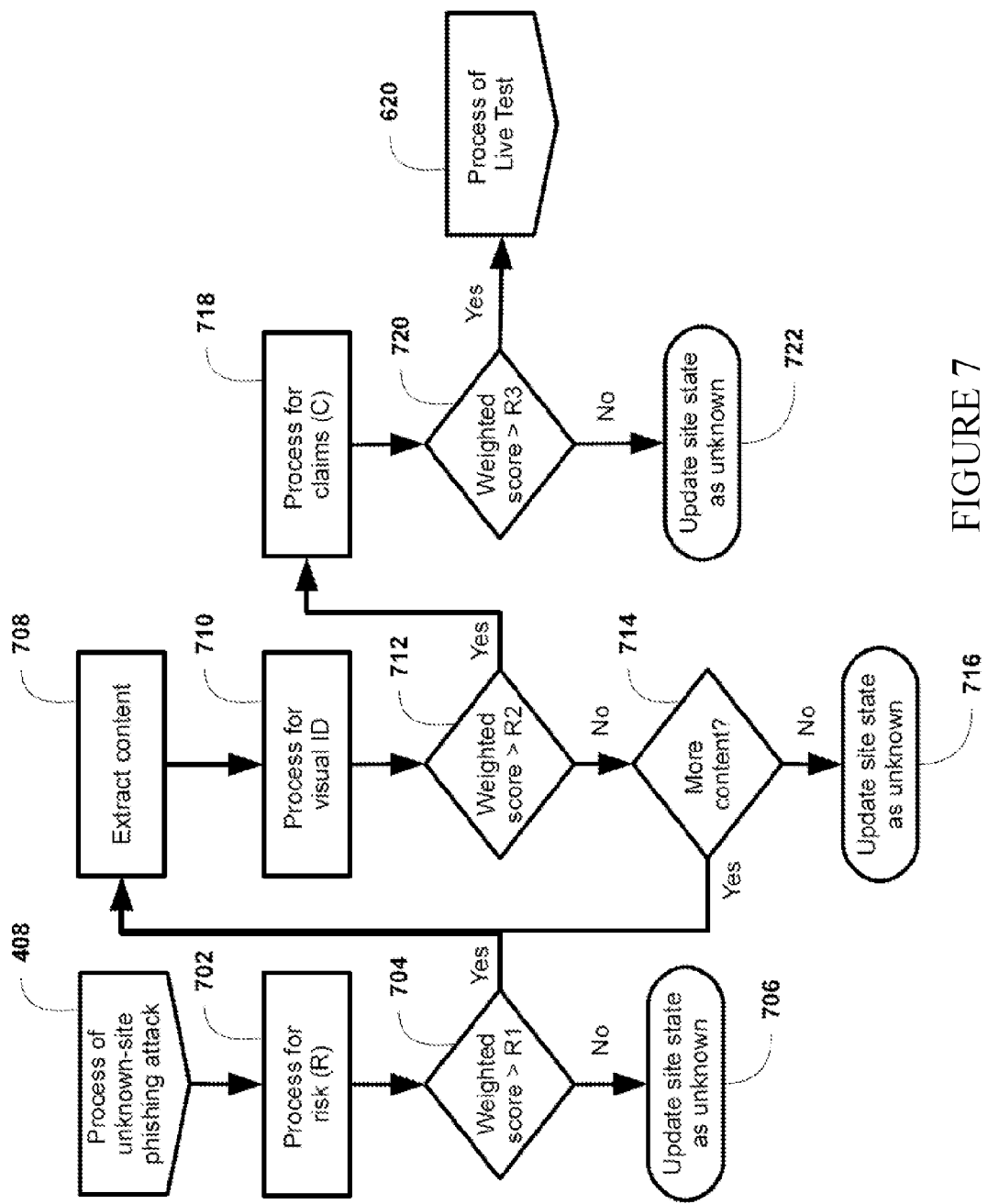
FIG. 7 depicts the flow chart representing process adopted by the Security Gateway to check for phishing activity on an unknown site, according to embodiments herein.

FIG. 7 depicts the flow chart representing process adopted by the Security Gateway to check for phishing activity on an unknown site, according to embodiments herein. The Suspicious Site Detection Engine (SSDE) 304 of the Security Gateway processes (702) the response page from the unknown site for risk (site risk) (for example, the response page is the page served by the unknown site as a response to HTTP request sent by the client through the click of a URL). In assessing the risk, the SSDE 304 scores the site for risk (sometimes referred to as site risk score) using a weighted scoring mechanism. When the weighted site risk score crosses (704) a threshold value (say, R1), then SSDE 304 may proceed to further analyze the unknown site. If the weighted site risk score does not cross the threshold value R1, then SSDE 304 may retain/update (706) the status of site as unknown in the Site Intelligence DB 306 and allow the interactions between the client that initiated the interaction and the unknown site to go through. For example, the message sent from the client is forwarded to the site.

If the weighted site risk score crosses (704) the threshold value of R1, the SSDE 304 extracts (708) the content of the response page from the unknown site and generates (710) a visual ID of the site to compare with visual ID of other well known sites either from the Site Intelligence DB or the Intelligence DB outside the network. In comparing the visual ID of the unknown site, the SSDE 304 generates a similarity score to assess if the generated visual ID is close to visual ID of any well known site for which fingerprint is already accessible by the Security Gateway 106. If the similarity score is greater (712) than a pre-defined threshold score value (say, R2) at any point before SSDE 304 extracts all content, the SSDE 304 proceeds to analyze the unknown site further. If the similarity score does not cross (712) the pre-defined threshold score value of R2, then SSDE 304 may retain (716) the status of the unknown site as unknown, and allow the interactions between the client that originated the interaction and the unknown site to go through. For example, the message sent from the client is forwarded to the site.

If the similarity score crosses the threshold value of R2, the SSDE 304 may further process (718) the unknown site for claims made by the site on its pages. Claims include but are not limited to copyright notices, references to any patents owned, brand names, symbols referring to registered marks or words, purported registered company names, and so on. The Information Extraction Engine 310 may obtain such information from one or more pages of the site by crawling the various links of the site. For example, once extracted, if links like "about us" and "contact us" are observed, then the SSDE 304 may check the links to see if they cross connect to a different domain. If they connect to same domain, then SSDE 304 may check if the page is a copy of well known site using signature items on the page (for example, address on a "contact us" page).

SSDE 304 extract claims information and compares it with corresponding information from reputed sites. At this stage, the SSDE 304 generates a third weighted score (sometimes referred to as claims score) to assess claims made from the site. If the weighted claims score crosses (720) a pre-defined threshold value (say, R3, sometimes referred to as a claims score threshold value) indicating that this site is claiming to be another well known site, SSDE 304 induces (620) a live testing process on the unknown site through the PLTE 308. If the weighted claim score does not cross (720) the pre-defined threshold value of R3 (claims score threshold value), then SSDE 304 may retain (722) the status of the unknown site as unknown, and allow the interactions between the client that originated the interaction and the unknown site to go through. For example, the message sent from the client is forwarded to the site.

In various embodiments, a site risk score may be arrived using information from DNS Query, IP and TCP/SSL handshakes, using attributes including but not limited to one or more of the following attributes:
IP—Autonomous System Number
Country/Region/City
Hosting Information
Name Server/Name Server IP
Domain New-ness
Host segment count in the host name (DNS)
Longest host segment length
Characters and numbers to Alphabets Ratio
Site and Communication Protected with Strong Cert
   HTTP vs. HTTPS
   Cert signing authority (e.g. Well Known, Blacklisted, Self)
   Crypto Algorithms and Key Size For live testing (620) of a page or a site, the PLTE 308 may follow one or more processes disclosed in a co-pending U.S. patent application titled "SYSTEM AND METHOD FOR VERIFYING A SUSPICIOUS HOST FOR PHISHING ACTIVITY IN REAL-TME" filed on even date, or any other similar processes that may be suitable.

The embodiments disclosed herein can be implemented through at least one software program running on at least one hardware device and performing network management functions to control the network elements. The network elements shown in FIGS. 1 and 2 include blocks which can be at least one of a hardware device, or a combination of hardware device and software module.

The embodiment disclosed herein specifies a system for real-time verification of a host for phishing activity. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The methods may be implemented through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for detecting a phishing site, comprising:
intercepting, by a security gateway, a message from a client to a site;
determining, by the security gateway, if the site is a known-site or an unknown-site;
checking, by the security gateway, reputation of the site, and
if the site is a known-site with a good reputation, performing, by the security gateway, known-site testing for possible phishing attack, wherein, the known-site testing includes:
identifying a page of the site being accessed;
determining if a reputation for the page of the site being accessed is known or unknown; and
if the reputation for the page of the site being accessed is unknown, performing an unknown page testing for possible phishing attack, wherein, the unknown page testing including:
generating a page risk score for the page;
comparing the page risk score with a threshold value; and
if the page risk score is greater than the threshold value, performing additional risk assessment, wherein, the additional risk assessment including:
determining claims made on the page;
determining claims made on the site;
comparing claims made on the page with claims made on the site for a match; and
if there is a match, forwarding the message from the client to the site.

2. The method of claim 1, wherein,
if the page risk score is less than or equal to a threshold value, forwarding the message from the client to the site.

3. The method of claim 1, wherein, if there is no match, performing additional testing of the page for possible phishing activity.

4. The method of claim 1, wherein claims made on the page includes one or more of copyright notice, patent owned and company name.

5. A system for detecting a phishing site, comprising:
a security gateway configured to
intercept a message from a client to a site;
determine if the site is a known-site or an unknown-site; and
if the site is known-site with a good reputation, perform a known-site test for possible phishing attack, wherein, the known-site test including:
identify a page of the site being accessed;
determine if a reputation for the page of the site being accessed is known or unknown; and
if the reputation for the page of the site being accessed is unknown, perform an unknown page test for possible phishing attack, wherein, the unknown page test including:

generate a page risk score for the page;

compare the page risk score with a threshold value; and if the page risk score is greater than the threshold value, perform additional risk assessment, wherein, the additional risk assessment includes:

determine claims made on the page;

determine claims made on the site;

compare claims made on the page with claims made on the site for a match; and if there is a match, forward the message from the client to the site.

6. The system of claim 5, wherein, if the page risk score is less than or equal to a threshold value, forward the message from the client to the site.

7. The system of claim 5, wherein, if there is no match, perform additional testing of the page for possible phishing activity.

8. The system of claim 5, wherein claims made on the page includes one or more of copyright notice, patent owned and company name.

* * * * *